March 20, 1951

E. H. FLETCHER 2,545,573

CONTROLLABLE STOP FOR REGULATING STROKES
OF FLUID PRESSURE APPARATUS

Filed May 11, 1949

Inventor:
E. H. FLETCHER
BY
ATTORNEY

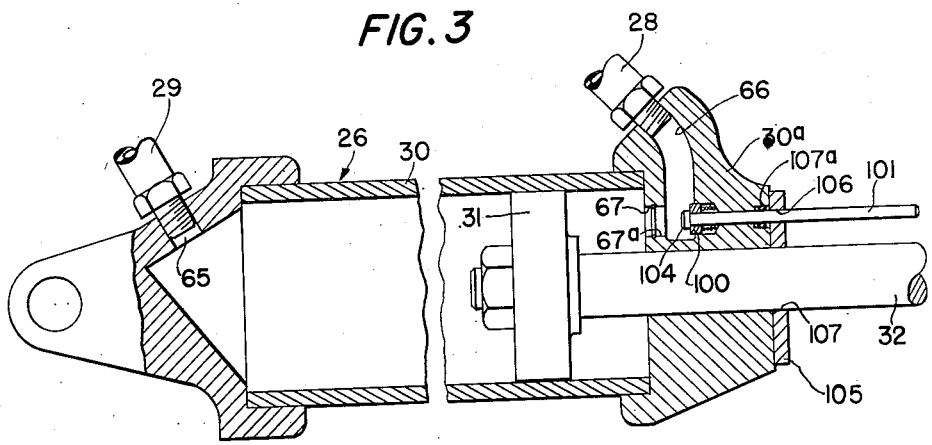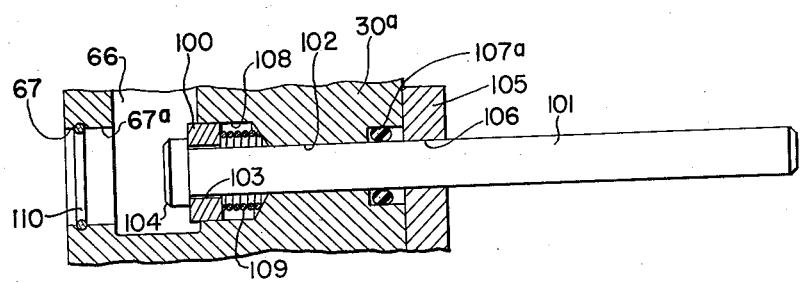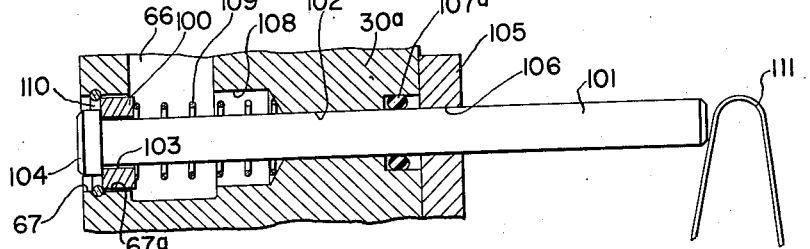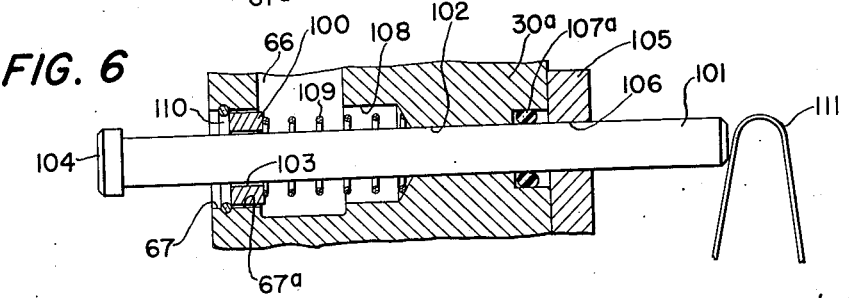

Patented Mar. 20, 1951

2,545,573

UNITED STATES PATENT OFFICE 2,545,573

CONTROLLABLE STOP FOR REGULATING STROKES OF FLUID PRESSURE APPARATUS

Edward H. Fletcher, Waterloo, Iowa, assignor to Deere Manufacturing Co., Dubuque, Iowa, a corporation of Iowa Application May 11, 1949, Serial No. 92,556

8 Claims. (Cl. 121—38)

This invention relates to fluid-pressure apparatus and particularly to means for regulating or controlling the stroke of a fluid-pressure motor.

Although the principles of the invention are capable of application in many and divers fields, the preferred form of the invention to be detailed subsequently herein was designed primarily for utilization in the regulation or control of agricultural implements of that class comprising a vehicle or equivalent supporting frame having a source of power for driving a fluid-pressure pump or the like to supply fluid under pressure to a motor, such as a cylinder and piston assembly, which is in turn connected to an adjustable implement part, such as a plow or earth-working tool or the platform of a harvester or equivalent machine. In the case of a plow, for example, it is desirable to adjust the plow so that it will plow at a uniform depth. It is further desirable that the plow may be raised from its plowing or working position, as at the end of a furrow, and be readily returned to working position by lowering of the same to the selected uniform depth, as when beginning a new furrow.

In one particular system, this general result is efficiently and simply achieved by the use of a pair of cooperating stops or abutment members on the relatively movable motor parts, such as the cylinder and piston. The fluid-pressure system is provided with a relief valve which operates in response to an excess of pressure in the system to return a main control valve to neutral to discontinue the supply of fluid to the motor or the exhaust of fluid from the motor. These cooperating stops may be adjusted in accordance with the desired position of adjustment of the implement part, so that when the implement part reaches its desired position, one stop will engage the other and prevent further relative movement of the motor parts, bringing about a condition of excess pressure which will affect the main control valve to isolate the motor from the fluid-pressure source. A disadvantage noted in this system is that the stops are positive in action and the motor cannot be operated to adjust the implement part beyond the position selected; that is to say, the plow, for example, having once had its position determined by the cooperating stops, cannot be moved to a greater depth without a readjustment of the stops. In the case of a plow or analogous equipment, the implement part or equivalent adjustable part is remotely located with respect to the fluid-pressure source, since the latter is on the tractor or propelling vehicle and the adjustable part is connected behind the tractor, for example, on trailing supporting structure. Therefore, it is necessary in the system referred to above for the operator to dismount from the tractor to accomplish a readjustment of the cooperating stops.

According to the present invention, the above system is modified and improved to the extent that stop means is effective to accomplish a limit on the amount of relative movement of the motor part for the general purposes stated above. The cooperating parts of the stop means are adjustable so that any desired normal limit may be effected. However, the stop means further includes provision for additional movement beyond the range of movement of the motor parts determined by the original setting of the stops. This object is preferably achieved in a system in which the fluid-pressure apparatus has a main control valve capable of regulating the volume of fluid supplied to the motor so that the motor may be caused to operate at either a high or a low speed. The control valve has, of course, a neutral position in which the motor is isolated from the fluid-pressure source. The system further preferably includes a pressure-relief valve effective to return the control valve to its neutral position in response to any condition of excess pressure in the system. In operation, the stop means is set in a desired position of adjustment and the normal adjusted position of the implement is effected after predetermined relative movement of the motor parts, the system operating like that previously described to the extent that a condition of excess pressure is created to cause the main control valve to return to neutral. In the present case, however, should the operator desire to move the implement beyond its normal adjusted position, he may operate the system at low speed, an important feature of the invention residing in the provision of a valve in the stop means which has a throttling or by-pass means which establishes a restriction to operation of the system at high speed but which will permit operation of the system at low speed.

An important object of the invention is to adapt the general idea discussed above to a fluid-pressure system of an existing type. In this respect, it is an object of the invention to incorporate the stop means and valve as part of a conventional or standard fluid-pressure motor of the cylinder-piston type. Generally, the invention contemplates the provision of a simplified and easily controlled fluid-pressure system.

The foregoing and other important objects and desirable features inherent in and encompassed by the prseent invention will become apparent to those versed in the art as a preferred form of the invention is fully described and illustrated in the following detailed description and accompanying sheets of drawings in which:

Figure 3 is an enlarged side elevational view, partly in section, of the fluid-pressure motor as incorporating the improved stop means; and Figures 4, 5 and 6 are enlarged fragmentary sectional views showing different operating positions of the valve and control members.

Figure 1:
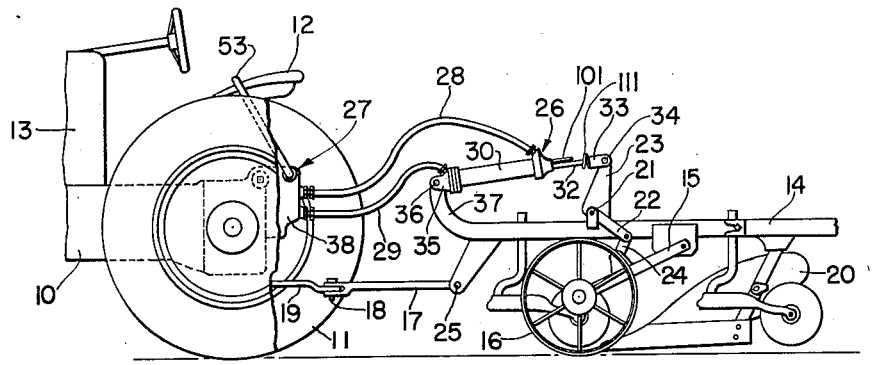
Figure 1 is a representative illustration of an implement arrangement to which the improved system may be applied.

The representative structure chosen for the purposes of illustration comprises, as shown in Figure 1, a tractor and a trailing implement. The tractor may be of any conventional construction and includes a longitudinal main body 10 carried on rear traction wheels 11, and provided with a rearwardly disposed operator's station 12 ahead of which is located an engine hood structure 13 within which is enclosed the usual power plant (not shown) for supplying power to the traction wheels 11.

The particular implement shown by way of illustration is a plow having a main frame 14 provided with a cranked axle 15 on which is journaled a ground wheel 16. The forward end of the frame 14 includes a draft member 17 which is pivotally connected at 18 to a conventional drawbar 19 on the tractor body 10. The groundworking tool is here represented by a plow bottom 20.

The plow frame or supporting structure 14 is provided just above the wheel 16 with a bearing 21 on which is pivoted a bell crank having first and second arms 22 and 23. The free end of the arm 22 is connected by a link 24 to the cranked axle 15. Rocking of the bell crank 22—23 in a clockwise direction, as viewed in Figure 1, will apply pressure through the link 24 to the axle 15 and will effect raising of the implement part comprising the frame 14 and plow bottom 20. The parts are shown in Figure 1 in substantially their uppermost positions. Rocking of the bell crank in a counterclockwise direction will result in a lowering of the parts 14 and 20. It will be understood that the connection of the hitch 17 to the frame 14 is accomplished in such manner as to provide for the necessary articulation of the frame 14 with respect to the hitch member 17, as by a pivot at 25. The general structure and arrangement of the tractor and implement are or may be conventional and resort need not be had to further detailed description thereof.

Adjustment of the plow bottom 20 between its raised position as shown and a lowered or groundworking position is accomplished by fluid-pressure apparatus comprising a fluid motor 26; means for controlling the supply of fluid under pressure to the motor, designated generally by the numeral 27 in Figure 1; and a fluid-pressure circuit including the components 26 and 27 and a pair of conduits 28 and 29.

The motor 26 comprises a cylinder 30 and a piston 31 slidable therein (Figure 3). The cylinder 30 forms a chamber within which the piston 31 is reciprocable and the latter includes a piston rod 32 which is provided at its free end with a clevis 33 for attachment at 34 to the upper end of the bell crank arm 23. The closed end of the cylinder 30 is provided with a clevis 35 which is connected at 36 to an upturned supporting portion 37 at the forward end of the implement frame 14. It will be seen that extension of the piston and piston rod with respect to the cylinder 30 will rock the bell crank 22—23 in a clockwise direction to raise the plow bottom and frame, and that retraction of the piston and piston rod will rock the bell crank in a counterclockwise direction to lower the plow bottom and frame.

Figure 2:
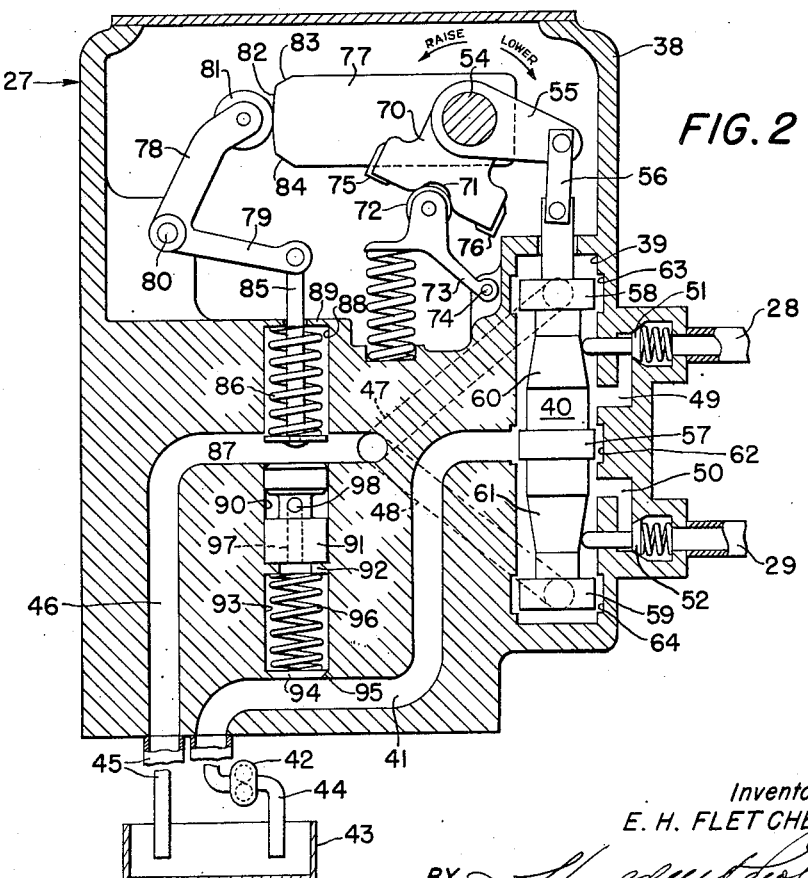
Figure 2 is an enlarged sectional view, somewhat schematic, of that portion of the fluid-pressure apparatus including the source of fluid pressure, the pressure-relief valve, and the main control valve.

The controlling and supplying means 27 is shown in Figure 2 as embodying typical construction in which the working parts are contained in a suitable housing 38 which may be secured to the rear portion of the tractor body 10 in any appropriate manner. The housing is provided with a vertical valve cylinder 39 within which a valve piston 40 is axially shiftable. The housing is provided with a fluid-supply or high-pressure passage or conduit 41 which is connected at one end to a suitable source of supply, such as a pump 42 (illustrated schematically in Figure 2).

The high-pressure line 41 and pump 42 represent the high side of the system. The low side of the system includes a reservoir 43 to which the pump is connected as by an intake conduit 44. The reservoir 43 is connected by a return conduit 45 to an exhaust passage 46 in the housing 38. The passage 46 includes a pair of branches 47 and 48 which are connected at axially spaced points in communication with the valve cylinder 39. The fluid-pressure-transmitting conduits 28 and 29 are also connected to the valve cylinder 39 by means of a pair of passages or conduits 49 and 50, respectively. A spring-loaded check valve 51 is provided in the passage 49—28 and a similar check valve 52 is provided in the passage 50—29.

The valve 40 is shown in Figure 2 in its neutral position and both check valves 51 and 52 are closed; therefore, the fluid motor 26 is hydraulically locked and the implement part 14—20 will be maintained in its selected position. Regulation of the control valve 40 is effected by means of a control level 53 carried by the housing 38 on a transverse rockshaft 54 and conveniently located with respect to the operator's station 12 (Figure 1). Within the housing 38, the rockshaft 54 has fixed thereto a crank arm 55 which is connected by a link 56 to the upper end of the valve 40. It will be evident that rocking of the control lever 53 in one direction or the other will result in axial shifting of the valve 40 in the valve cylinder 39.

The valve 40, as illustrated, is of the spool type and is so constructed that in its neutral position, as shown, fluid supplied by the pump 42 through the passage 41 will circulate axially in opposite directions from the central portion of the valve cylinder 39 to end portions of the cylinder 39 for return through the exhaust branches 47 and 48 and thence through the exhaust passage 46 and return duct 45 to the reservoir 43. It will be understood, of course, that the pump 42 is operated by any suitable means on the tractor.

For the purposes of effecting the desired control of the fluid-pressure system, the valve 40 includes a central cylindrical portion 57, and upper and lower cylindrical portions 58 and 59 respectively. Intermediate the portions 57 and 58, the valve 40 is provided with a tapered section 60, and a similar tapered section 61 is provided intermediate the portions 57 and 59. The valve cylinder 39 is of substantially uniform diameter throughout its length except for annular recesses 62, 63 and 64. These recesses correspond in position respectively with the high-pressure passage 44 and exhaust branches 47 and 48. In the neutral position of the valve 40, as shown in Figure 2, the tapered portions 60 and 61 are located as illustrated with respect to the check valves 51 and 52, respectively.

Operation of the system to the extent described is as follows: The control lever 53 may be moved a maximum distance forwardly, or in a counterclockwise direction, to effect maximum upward shifting of the valve 40 in the valve cylinder 39. The result is that the cylindrical portion 57 of the valve cuts off the supply of fluid upwardly through the valve cylinder and directs the fluid downwardly to the check valve 52. The pressure rise in this portion of the system causes the check valve 52 to open to its maximum extent and fluid is supplied under pressure through the passage 50 to the lower conduit 29 which, in turn, supplies fluid under pressure to the closed end of the cylinder through a conduit or passage 65. Ignoring for the moment the detailed structure of the cylinder 30, it will be seen that the result is to extend the piston rod 32 with respect to the cylinder and thus to raise the implement to the position shown in Figure 1.

Simultaneously with the raising of the valve 40, as aforesaid, the tapered portion 60 engages the stem of the upper check valve 51 and causes this valve to open to its maximum extent against its loading spring, thereby establishing communication between the upper conduit 26 and upper passage 49 and providing for the exhaust of fluid at its maximum rate of flow from the rod end of the cylinder past the upper portion of the valve 40 and into the exhaust branch 47 and thence through the passages 46 and 45 to the reservoir 43. Return of the control lever 53 to its neutral position effects hydraulic locking of the motor 26 as stated above.

The conduit 28 is connected to the rod end of the cylinder 30 by means of a passage 66 and intersecting bore 67, the latter including a generally circular port 67a, all of which are formed in a casting 30a which provides, in effect, part of the cylinder 30. The control of the port 67a will be described below.

Rocking of the lever 53 a maximum distance in a clockwise direction, or to the rear, as viewed in Figure 1, reverses the procedure just described and the motor 26 may be contracted to effect lowering of the implement part.

The control means 27 presently illustrated includes means for controlling the volume of fluid under pressure to the motor 26 to effect either high-speed or low-speed operation of the motor. This means includes the valve 40 and the parts just described, together with means for indicating to the operator certain positions of the valve in which the system may be caused to operate at either of the speeds referred to. For this purpose, the control lever rockshaft 54 carries fixedly thereon within the housing 38 a plate 70 which is centrally notched at 71 to normally receive a roller 72 which forms part of a spring-loaded arm 73 that is pivoted to an interior portion of the housing 38, as at 74. Opposite portions of the plate member 70 that border the notch 71 are substantially straight but terminate in lugs 75 and 76, respectively. This arrangement provides that the operator, when moving the control lever forwardly, for example, may, at an intermediate point in the range of movement, feel first the disengagement of the roller 72 from the notch 71 and then the engagement of the roller with the lug 75. At this point, the valve 40 will be only partly shifted upwardly in the valve cylinder 39 and a smaller volume of fluid will be supplied as compared with the volume of fluid supplied when the valve 40 is fully opened, since partial shifting of the valve 40 results in only partial opening or cracking of the valve 51, thus metering, or reducing the rate of flow of, fluid exhausted from the motor through the conduit 28. Although the pressure in the system will actually open the lower valve 52 to its maximum, metering as aforesaid at the valve 51 will result in diversion of part of the fluid on the high side back to the reservoir through the pressure-relief means described below. Various types of metering valves may be used in place of the check valves 51 and 52, as in assignee's copending application, Serial No. 626,626, filed November 5, 1945, now Patent No. 2,532,552, granted December 5, 1950, but, since the present system is shown only diagrammatically, the detailed structure has been omitted.

In the event that the operator desires to effect a relatively fine adjustment of his implement, he will utilize this slow speed. He can, of course, move the control lever past the point at which he feels engagement between the roller 72 and lug 75 to obtain high-speed operation. A similar result may be obtained in movement of the lever 53 in the opposite direction.

The control system illustrated has means for automatically returning the control valve 40 to neutral in response to excess pressure in the system. Part of this means includes an arm 77 fixed to the rockshaft 54 and associated with a bell crank having arms 78 and 79. This bell crank is pivoted at 80 to the interior of the housing 38. The arm 78 carries a roller 81 which rides on an arcuate portion 82 of the arm 77. This portion is formed about the axis of the rockshaft 54 and terminates at each of its opposite ends in cut-off corners 83 and 84 respectively. The bell crank 78—79 is spring-loaded by means including a rod 85, a compression spring 86, and a washer 87. A portion of the housing 38 is bored at 88 to accommodate the spring 86. The rod 85 is connected at one end to the arm 79 and is headed at its other end to carry the washer 87. The spring 86 is confined between the washer 87 and a wall 89 which forms the end of the bore 88. The action of the spring is such as to keep the roller 81 in constant engagement with the arcuate portion 82 or either of the corners 83 and 84, as the case may be.

The extent of the arc 82 is proportional to the range of movement of the control lever 53 in effecting slow-speed operation of the system in either direction. Hence, when the operator releases the control lever 53 the spring-loaded lever or arm 73 will be effective to return it to neutral from either of its slow-speed positions, inasmuch as the corners 83 and 84 on the plate 77 do not, in this range of movement of the lever 53, cooperate with the roller 81 to establish a lock on the rockshaft 54. Also, operation of the relief valve as an adjunct to metering, as stated above, will not affect the control lever, since the lever is not locked in either slow-speed position. However, when the control lever is moved to its maximum or high-speed position in either direction, the roller 81 engages with one or the other of the corners 83 or 84 and acts to hold the control lever 53 in either maximum position. The operator may, of course, overcome the locking action at will and move the control lever 53 to any other position.

The housing 38 has a bore 90 below the bore 88, these bores opening to the return passage 46. A valve 91 is slidable in the bore 90 and normally rests on an annular apertured wall 92 which separates the bore 90 from a coaxial bore 93. Communication between the passage 41 and the bore 93 is controlled by a relief valve 94, normally held on a valve seat 95 by means of a relatively heavy compression spring 96. The spring 96 is calibrated to hold the valve 94 seated during operation of the system at normal pressures.

In the event of abnormal rise of pressure in the system, the valve 94 will open against the spring 96 and fluid from the high-pressure passage 41 will enter the bore 93, pass through the apertured wall 92 and raise the valve member 91 in the bore 90. Upward movement of the valve member 91 is followed by engagement of this valve member with the headed end of the rod 85, thus compressing the spring 86 and rocking the bell crank 78—79 in a counterclockwise direction to release the roller 81 from one or the other of the corners 83 or 84 on the plate 77. Upon release of the roller from the plate, the spring-loaded arm or lever 73 causes the rockshaft 54 and plate 70 to move angularly until the roller 72 again seats in the arcuate notch 71, which position determines the neutral position of the valve 40. Pressure relief valves of this type and for the purpose described are well known and any conventional construction may be substituted for that illustrated. Excess fluid pressure that causes upward movement of the valve member 91 and unlocking of the bell crank 78—79 is returned to the reservoir through the passages 45 and 46 by means of a pair of intersecting bores 97 and 98 in the valve member 91. It will be understood, of course, that when the valve member 91 raises, the bore 98 will communicate with the horizontal portion of the return conduit 46.

In systems of the type heretofore known, an excellent example of which is disclosed and claimed in the U. S. Patent 2,442,306, issued to McCormick, the pressure-relief means is utilized in connection with adjustable stop means between the piston and piston rod for deliberately creating a condition in which part of the stop means may interengage at a selected point to limit travel of the piston rod with respect to the cylinder, thereby causing the pressure-relief means to return the control valve to neutral. Such arrangement, as aforesaid, is desirable in returning a plow, for example, to working position after it has been raised. In the use of a system of the type referred to, the operator is relieved of the burden of re-determining the ground-working position of his implement upon lowering of the implement from a raised position. These characteristics are, of course, present in other situations, as in a harvester, for example, in connection with the raising and lowering of the harvester platform; although, the operations may be in reverse order.

One characteristic of the system described generally above is that the stops are positive; that is, once set, the stops must be readjusted manually in the event that the operator desires to adjust the implement to a position of increased depth, for example, beyond that determined by the stops. Then, he must again readjust the stops to secure his original adjustment, all of which requires that the operator dismount from the tractor and make the necessary adjustment.

According to the present invention, there is provided stop means including provision whereby the stops or their equivalent may be controlled by the operator through the medium of the control lever 53; therefore, the operator need not dismount from the tractor. At the same time, the stop means is so arranged as to retain the original adjustment even though allowing for variations in this adjustment from time to time. The manner in which these desirable results are achieved in the preferred form of the invention illustrated will be described below.

As previously described, the operator may, by means of the lever 53, rock the rockshaft 54 so that the valve 40 is moved upwardly in the valve cylinder 39, resulting in the transmission of fluid under pressure through the conduit 29 to the closed or left-hand end of the cylinder 30 and simultaneously opening the check valve 51 for the return or exhaust of fluid through the conduit 28 to the reservoir 43 via the passages 49, 47, 46 and 45.

The port 67a and passage 66 are under control of a valve 100. This valve, like the port 67a, is generally circular and the outside diameter of the valve is somewhat less than the inside diameter of the port so that a slight leakage clearance is provided. In the preferred form of the invention illustrated, the valve 100 is guided in its movement by means including a control member or rod 101 which is axially slidably carried by the casing part coaxially with the port 67a and valve 100, the casing part being provided with a bore 102 for this purpose. The valve 100 is centrally apertured at 103 and the rod 101 extends slidably therethrough. The inner end of the rod 101, or that portion thereof approximate to the port 67a, is provided with a portion in the form of an enlarged head 104. The rod is substantially elongated and projects outside the casing part 30a, for a purpose to presently appear. A plate 105 is carried at the end of the casing part 30a and is apertured respectively at 106 and 107 to accommodate the rod 101 and the piston rod 32. An appropriate fluid-pressure seal 107a is associated with the rod 101 and the casing part 30a, for obvious purposes.

Since the passage 66 intersects the bore 67a, the bore will include axial parts, one of which is the port 67a and the other of which is a counterbore 108 as respects the bore 102. This counterbore contains a light compression spring 109, which is one form of means for incurring movement of the valve 100 toward a port-closing or port-restricting position as respects the port 67a. The port 67a includes means, here preferably in the form of a circular snap ring 110, for limiting or restraining movement of the valve 100 beyond its port-restricting position, as best shown in Figures 5 and 6. The outside diameter of the rod 101 is somewhat less than the inside diameter of the central aperture in the valve 100 through which the rod passes, thereby providing a slight leakage clearance for fluid under pressure.

The portion of the rod 101 that extends outside the motor 26 comprises one of a pair of cooperative elements for controlling the valve 100, the other of which is in the form of a stop on the piston rod 32. In the present instance, the form of stop illustrated is a bent member 111, preferably formed of spring steel, and apertured to receive the piston rod 32. The free ends of the member 112 may be squeezed together manually so that the position of the member 111 may be adjusted on the rod 32, thereby giving the user a variety of ranges through which the piston will move before the member 111 engages the rod 101.

Operation

When fluid under pressure is supplied through the conduit 29 and passage 65 to the closed end of the cylinder 30, the piston 31 is caused to move to the right, thus extending the distance between the points 34 and 36 and effecting raising of the plow 14—20. At the same time, the chamber formed between the casing part 30a and the right-hand side of the piston 31 is reduced and fluid is exhausted through the port 67a and passage 66 to the chamber 28, ultimately to return to the reservoir as previously described. Fluid exhausted through the port 67a by reduction in the cylinder chamber just described is applied to the radial fluid-pressure-receivable area at the port side of the valve 100, with the result that the valve is shifted to the right against the light compression spring 109. The inner end portion or head 104 on the rod 101 likewise constitutes a radial fluid-pressure-receivable area which is also subject to exhaust fluid pressure through the port 67a, with the result that the rod 101 is ultimately shifted by exhaust fluid pressure to the right. However, in a previous retraction stroke of the motor 26, wherein the piston 31 moves to the left, the stop member 111 will have engaged the rod 101 to move it to the position illustrated in Figure 5, for example. In this case, initial application of fluid pressure at the left-hand side of the piston 31 will result in relatively low-speed operation of the piston 31 to the right, because of the restriction set up by the closed valve 100. However, as the piston 31 moves slightly to the right, it releases the member 111 from the rod 101 until the restriction at the port 67a ultimately builds up pressure sufficiently to effect opening of the valve 100 even though the rod 101 is forcibly held by the member 111. The slight leakage through the port 67a has now become a relatively considerable volume of fluid and the piston 31 may be moved more rapidly to the right. Ultimately, exhaust fluid pressure shifts the rod 101 to its maximum position to the right.

Ordinarily, the operator will extend the motor 26 to its maximum distance to effect maximum lifting of the plow. The rod 101 extends only a limited distance outside the casing part 30a and, depending upon the adjustment of the member 111, the member 111 normally will be relatively widely separated from the rod 101, it being understood that the position of the member 111 on the piston rod 32 ultimately determines the position at which the plow will stop when lowered; although, as will be presently described, this selected lowered position of the plow may be exceeded if desired.

Assuming now that the operator has kept the stop 111 at a desired position on the piston rod 32, he may rock the control lever 53 in a clockwise direction (as viewed in Figures 1 and 2) to effect downward movement of the control valve 40. This will result in mechanically opening the lower check valve 52 in the casing 38 so that free fluid communication is established between the conduit 29 and the reservoir. Simultaneously, the pressure rise in that portion of the valve cylinder 39 above the valve portion 57 causes opening of the check valve 51 and transmission of fluid through the conduit 28 to the passage 66 and port 67a. Fluid is thus exhausted from the left-hand end of the cylinder through the conduit 29 and fluid under pressure is supplied to the right-hand end of the cylinder. Thus the chamber at the right-hand side of the piston is expanded; and, as the piston 32 moves to the left, the stop 111 gradually approaches the rod 101. Although the spring 109 is sufficiently strong to cause closing of the valve 100 by itself, it does not have sufficient strength to move both the valve 100 and the rod 101, partly because of the additional fluid-pressure-receivable area provided by the head 104 on the rod 101 and partly because of friction occasioned by the fluid seal 107 on the rod 101. Hence, the rod 101, when positioned to the right, as illustrated in Figure 4, provides means for incurring or holding the port-opening position of the valve.

When the member 111 on the piston rod 32 engages the outer end of the rod 101, it forcibly moves the rod 101 inwardly toward the port 67a. This overcomes any fluid pressure on the rod and also overcomes any friction at the seal 107. Thereupon, the spring 109 is called upon merely to move the valve 100. Hence, the valve 100 follows the head and rod 101 to the left. As the valve 101 approaches the port 67a, it establishes a restriction in the passage that communicates to the right-hand end of the cylinder and when the valve ultimately seats in the port 67a the restriction is so great as to cause a pressure rise in the system. This pressure is greater than the maximum allowable, with the result that the pressure relief valve 94 is caused to operate and in turn effect movement of the control lever 53 to neutral position. This result follows, assuming that the operator has moved the control lever to its "lower" position and has then released it. After the control lever 53 and valve 40 move to their neutral positions, as illustrated in Figure 2, the motor 26 is hydraulically locked and the pump 42 circulates fluid through the casing 38 at no appreciable pressure. Hence, closing of the valve 100 in the port 67a establishes a stop which limits lowering of the plow 14—20. It will be understood, of course, that this result will obtain in connection with the determining of a particular position in any implement equipped with the invention here disclosed.

Now, if for some reason or other, the operator wishes to move the implement (here the plow) beyond its position as determined or selected by the valve 100 and control rod 101, he may again move the control lever 53 so as to shift the valve 40 to its "lower" position. Although the restriction set up by the valve 100 in the port 67a will, as previously described, set up a condition causing excessive pressure in the system, the maximum pressure is still available in the passage 66. The operator may, by forcibly holding the control lever 53, maintain the "lower" position of the valve 40. Inasmuch as there is a slight leakage at the closed valve 100, both at the outside diameter of the valve and at the inside diameter of the aperture in the valve, fluid may be introduced to the right-hand end of the cylinder to cause further movement of the piston 31 to the left. Even though the valve 100 is stopped or restrained by the limiting snap ring 110, the head 104 of the rod 101 is smaller than the bore 67 and port 67a, and further movement of the piston rod 32 and member 111 will move the rod 101 forcibly to the left beyond the position established by the valve.

This overshifting of the rod 101 is permitted because of the one-way connection or engagement between the head 104 of the rod 101 and the valve 100. That is to say, the arrangement is such that movement of the rod to the right will carry with it the valve 100. Yet, movement of the rod 101 to the left, beyond the position illustrated in Figure 5, will be separate from the valve 100. Also, as previously described, the valve 100 may move to the right separate from the rod 101.

Assuming now that the control by the operator is such as to achieve the position of the parts illustrated in Figure 6, the operator has only to release the lever 53 and the excess pressure built up in the system will again return the control valve to neutral. When the operator desires to again effect raising of the implement by extension of the motor 26, he has only to move the control lever 53 forwardly so that the valve 40 is raised in the valve cylinder 39. The result will be as aforesaid; that is, the leakage through the closed valve 100 is such as to permit the piston 31 to move slowly to the right until the port 67ª is ultimately opened, which will follow from release of pressure on the rod 101 by the member 111 and increase of fluid pressure on the fluid-pressure-receivable areas of the valve and inner end of the rod.

Summary

It will be seen from the foregoing description and accompanying illustration that an improved and flexible form of control has been provided for a fluid-pressure system, particularly of the type illustrated, wherein selected or determined positions of implements are normally desired but wherein other positions may become necessary from time to time. These other positions may be achieved without rearranging mechanical connections, such as were heretofore known in the art.

Other features of the invention, not specifically pointed out above, will undoubtedly occur to those versed in the art, as likewise will numerous modifications and alterations in the preferred form of the invention illustrated, all of which may be achieved without departing from the spirit and scope of the invention as defined in the appended claims.

What is claimed is:

1. In a fluid-pressure system: means providing a passage and a communicating, generally circular port for transmitting fluid under pressure at times in one direction and at times in the reverse direction; a generally circular valve selectively shiftable back and forth on the axis of the port between a port-opening position and a port-closing position, said valve and port being so formed as to provide for restricted passage of fluid when the valve is in port-closing position, and said valve having an area subject to reverse fluid pressure for shifting of the valve to port-opening position; yielding means normally effective to incur the port-closing position of the valve; means for restraining the valve against overshifting beyond its port-closing position; means providing an axial aperture in the valve; a control member extending slidably through the valve aperture and having at the port side of the valve a first portion providing an area subject to reversed fluid pressure for axial shifting of the member in one direction corresponding to shifting of the valve to its port-opening position and a second portion at the other side of the valve providing for forcible axial shifting of the member in the opposite direction; said port and said first portion of the member being so dimensioned that said first portion may enter the port when forcibly overshifted in said opposite direction while the valve is restrained at its port-closing position; and means on the member providing for one-way engagement of the valve by the member when the member is shifted by reverse fluid pressure so that the valve is held by the member at port-opening position and so that the member may be overshifted as aforesaid.

2. In a fluid-pressure system: means providing a passage including a communicating port for transmitting fluid under pressure at times in one direction and at times in the reverse direction; a valve selectively shiftable back and forth between a port-opening position and a port-closing position, said valve and port being so formed as to provide for restricted passage of fluid when the valve is in port-closing position, and said valve having an area subject to reverse fluid pressure for shifting of the valve to port-opening position; yielding means normally effective to incur the port-closing position of the valve; means for restraining the valve against overshifting beyond its port-closing position; a control member shiftable relative to and extending at opposite sides of the valve, said member having at one side of the valve a first portion providing an area subject to reversed fluid pressure for shifting of the member in one direction corresponding to shifting of the valve to its port-opening position and a second portion at the other side of the valve providing for forcible shifting of the member in the opposite direction; said passage and said first portion of the member being so dimensioned that said first portion may enter the port when forcibly overshifted in said opposite direction while the valve is restrained at its port-closing position; and means on the member providing for one-way engagement of the valve by the member when the member is shifted by reverse fluid pressure so that the valve is held by the member at port-opening position and so that the member may be overshifted as aforesaid.

3. In a fluid-pressure system: means providing a passage for transmitting fluid at times in one direction and at times in the reverse direction; a valve shiftable selectively back and forth between a passage-opening position and a passage-restricting position and having a fluid-pressure-receivable area subject to reversed fluid pressure for shifting of the valve to passage-opening position; a control member shiftable back and forth and having a first portion providing a fluid-pressure-receivable area, subject to reversed fluid pressure for shifting of the member in one direction toward a first position, and a second portion providing for forcible shifting of the member in the opposite direction toward a second position; means for restraining the valve against overshifting beyond its passage restricting condition; means engageable between the valve and the member for holding the valve in passage-opening position when the member is in its first position, said means being separable to provide for forcible overshifting of the member toward its second position and relative to the valve when the valve is restrained at its passage-restricting position; and means for incurring shifting of the valve toward its passage-restricting position upon forcible shifting of the member toward its second position, and providing further for shifting of the valve toward passage-opening position by reversed fluid pressure even though the member is forcibly held toward its second position.

4. In a cylinder and piston assembly in which the cylinder has an end wall and the piston has a piston rod extending outwardly through said wall, the improvement comprising: means providing a fluid passage in the end wall, including a bore paralleling the piston rod and opening as a coaxial circular port to the interior of the cylinder for carrying fluid to and from the cylinder; means in the end wall providing a smaller counterbore forming a shoulder at its junction with the bore and spaced coaxially outwardly from the port, said counterbore opening through the end wall in the direction of outward extension of the piston rod; a control member slidable in the counterbore and having one end portion outside the end wall and another end within the bore having a circular head larger than the counterbore but smaller than the port; a circular, centrally apertured valve slidable on the member intermediate the head and the aforesaid shoulder and cooperative to seat in and be unseated from the port; biasing means interposed between the valve and said shoulder for urging the valve against the head and inwardly toward the port; means at the port for limiting inward movement of the valve but disposed out of the path of inward movement of the head; and means positionable on the piston rod outside the cylinder for engaging the member to move the member inwardly.

5. In a cylinder and piston assembly in which the cylinder has an end wall and the piston has a piston rod extending outwardly through said wall, the improvement comprising: means providing a fluid passage in the end wall, including a passage portion transverse to the piston rod and further including a bore generally parallel to the piston rod and intersecting said passage portion, said bore opening to the cylinder as a port for carrying fluid to and from the cylinder; means in the end wall providing a smaller counterbore forming a shoulder at its junction with the bore and spaced coaxially outwardly from the port, said counterbore opening through the end wall in the direction of outward extension of the piston rod; a control member slidable in the counterbore and having one end portion outside the end wall and another end within the bore having a circular head larger than the counterbore but smaller than the port; a circular, centrally apertured valve slidable on the member intermediate the head and the aforesaid shoulder and cooperative to seat in and be unseated from the port; biasing means interposed between the valve and said shoulder for urging the valve against the head and inwardly toward the port; means at the port for limiting inward movement of the valve but disposed out of the path of inward movement of the head; and means positionable on the piston rod outside the cylinder for engaging the member to move the member inwardly.

6. In a fluid pressure system, the combination of: a fluid motor having first and second relatively movable motor parts, the first of which includes a fluid-receiving chamber and means providing a passage and a communicating, generally circular port for transmitting fluid under pressure at times in one direction and at times in the reverse direction from said chamber; a generally circular valve selectively shiftable back and forth on the axis of the port between a port-opening position and a port-closing position, said valve and port being so formed that they provide for restricted passage of fluid when the valve is in port-closing position, and said valve having an area subject to reverse fluid pressure for shifting of the valve to port-opening position; yielding means normally effective to incur the port-closing position of the valve; means for restraining the valve against over-shifting beyond its port-closing position; means providing an axial aperture in the valve; a control member extending slidably through the valve aperture and having at the port side of the valve a first portion providing an area subject to reverse fluid pressure for axial shifting of the member in one direction corresponding to shifting of the valve to its port-opening position and a second portion at the other side of the valve arranged to be engaged by the second motor part upon predetermined shifting of said second motor part for forcible axial shifting of the member in the opposite direction, said port and said first portion of the member being so dimensioned that said first portion may enter the port when forcibly over-shifted in said opposite direction while the valve is restrained in its port-closing position; and means on the member providing for one-way engagement of the valve by the member when the member is shifted by reverse fluid pressure so that the valve is held by the member at port-opening position and so that the member may be over shifted as aforesaid.

7. In a fluid pressure system, the combination of: a fluid motor having first and second relatively movable motor parts, the first of which includes a fluid-receiving chamber and means providing a passage including communicating ports for transmitting fluid under pressure at times in one direction to and at times in the reverse direction from said chamber; a valve selectively shiftable back and forth between a port-opening position and a port-closing position, said valve and port being so formed as to provide for restricted passage of fluid when the valve is in port-closing position, and said valve having an area subject to reverse fluid pressure for shifting of the valve to port-opening position; yielding means normally effective to incur the port-closing position of the valve; means for restraining the valve against over-shifting beyond its port-closing position; a control member shiftable relative to and extending at opposite sides of the valve, said member having at one side of the valve a first portion providing an area subject to reversed fluid pressure for shifting of the member in one direction corresponding to shifting of the valve to its port-opening position and a second portion at the other side of the valve and engageable by said second motor part upon predetermined movement of said second motor part relative to the first motor part and providing for forcible shifting of the member in the opposite direction; said passage and said first portion of the member being so dimensioned that said first portion may enter the port when forcibly over-shifted in said opposite direction while the valve is restrained at its port-closing position; and means on the member providing for one-way engagement of the valve by the member when the member is shifted by reverse fluid pressure so that the valve is held by the member at port-opening position and so that the member may be overshifted as aforesaid.

8. In a fluid-pressure system, the combination of: a fluid motor having first and second relatively movable motor parts, the first of which includes a fluid-receiving chamber and means providing a passage for transmitting fluid at times in one direction to and at times in the reverse direction from said chamber; a valve shiftable selectively back and forth between a passage-opening position and a passage-restricting position and having a fluid-pressure-receivable area subject to reversed fluid pressure for shifting of the valve to passage-opening position; a control member shiftable back and forth and having a first portion providing a fluid-pressure-receivable area, subject to reversed fluid pressure for shifting of the member in one direction toward a first position, and a second portion engageable by the second motor part upon predetermined movement of said second motor part relative to the first motor part and providing for forcible shifting of the member in the opposite direction toward a second position; means for restraining the valve against overshifting beyond its passage-restricting condition; means engageable between the valve and the member for holding the valve in passage-opening position when the member is in its first position, said means being separable to provide for forcible overshifting of the member toward its second position and relative to the valve when the valve is restrained at its passage-restricting position; and means for incurring shifting of the valve toward its passage-restricting position upon forcible shifting of the member toward its second position, and providing further for shifting of the valve toward passage-opening position by reversed fluid pressure even though the member is forcibly held toward its second position.

EDWARD H. FLETCHER.

No references cited.